United States Patent
Procopio et al.

(10) Patent No.: US 10,176,192 B2
(45) Date of Patent: *Jan. 8, 2019

(54) SYSTEM AND METHOD FOR DETECTING AND INTEGRATING WITH NATIVE APPLICATIONS ENABLED FOR WEB-BASED STORAGE

(71) Applicant: Google Inc., Mountain View, CA (US)

(72) Inventors: Michael Jeffrey Procopio, Boulder, CO (US); Tobias Thierer, Glebe (AU); Reuben Kan, Epping (AU); Ivan Young Lee, Boulder, CO (US); Eric Benson Schoeffler, Boulder, CO (US); Brian Lewis Cairns, Boulder, CO (US)

(73) Assignee: Google LLC, Mountain View, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/069,397

(22) Filed: Mar. 14, 2016

(65) Prior Publication Data

US 2016/0196280 A1   Jul. 7, 2016

Related U.S. Application Data

(63) Continuation of application No. 13/787,187, filed on Mar. 6, 2013, now Pat. No. 9,317,709.

(Continued)

(51) Int. Cl.
*G06F 17/30* (2006.01)
*G06F 21/62* (2013.01)
(Continued)

(52) U.S. Cl.
CPC .. *G06F 17/30203* (2013.01); *G06F 17/30106* (2013.01); *G06F 17/30283* (2013.01);
(Continued)

(58) Field of Classification Search
CPC ............ G06F 21/6218; G06F 9/44505; G06F 21/335; G06F 2221/2141; G06F 17/30997;
(Continued)

(56) References Cited

U.S. PATENT DOCUMENTS 7,263,688 B2   8/2007   Pitzel et al.
7,680,932 B2   3/2010   Defaix et al.
(Continued)

FOREIGN PATENT DOCUMENTS

KR   10-2010-0137323   12/2010
KR   10-2012-0010397   2/2012
(Continued)

OTHER PUBLICATIONS

Beresford et al., "MockDroid: Trading Privacy for Application Functionality on Smartphones," HotMobile '11, Mar. 1-3, 2011, Phoenix, AZ, USA, pp. 49-54.

(Continued)

*Primary Examiner* — Dangelino N Gortayo
(74) *Attorney, Agent, or Firm* — Lowenstein Sandler LLP

(57) ABSTRACT

A cloud storage system provides remote access to a file associated with the cloud storage system. In response to a request to access the file, the cloud storage system identifies applications available to the request generator and capable of accessing the file, which may include both online web-based applications and applications installed on a device with which the user is accessing the file. The cloud storage system determines an application type of an identified application, and provides file access to the identified application based on the application type.

21 Claims, 8 Drawing Sheets

Related U.S. Application Data

(60) Provisional application No. 61/664,627, filed on Jun. 26, 2012, provisional application No. 61/664,651, filed on Jun. 26, 2012.

(51) Int. Cl.
   *H04L 29/08* (2006.01)
   *H04L 29/06* (2006.01)

(52) U.S. Cl.
   CPC ...... *G06F 21/6218* (2013.01); *H04L 63/0876* (2013.01); *H04L 67/1097* (2013.01); *H04L 67/303* (2013.01); *H04L 67/34* (2013.01); *G06F 17/30067* (2013.01); *G06F 17/30194* (2013.01); *G06F 17/30233* (2013.01)

(58) Field of Classification Search
   CPC ............... G06F 8/60; G06F 17/30011; G06F 17/30174; G06F 17/30233; H04L 63/105; H04L 67/02
   USPC ....... 707/783, 705, 736, 748, 758, 769, 803, 707/827
   See application file for complete search history.

(56) References Cited

U.S. PATENT DOCUMENTS

| | | |
|---|---|---|
| 7,689,633 B1 | 3/2010 | Li et al. |
| 7,707,413 B2 | 4/2010 | Lunt et al. |
| 7,711,835 B2 | 5/2010 | Braddy et al. |
| 7,734,914 B1 | 6/2010 | Malasky |
| 7,779,113 B1 | 8/2010 | Samar |
| 7,827,201 B1 | 11/2010 | Gordon et al. |
| 7,917,888 B2 | 3/2011 | Chong et al. |
| 7,941,419 B2 | 5/2011 | Bhatkar et al. |
| 7,996,380 B2 | 8/2011 | Arrouye et al. |
| 8,108,427 B2 | 1/2012 | Prahlad et al. |
| 8,131,723 B2 | 3/2012 | Sim-Tang |
| 8,151,323 B2 | 4/2012 | Harris et al. |
| 8,250,455 B2 | 8/2012 | Kadowaki et al. |
| 8,341,708 B1 | 12/2012 | Eatough et al. |
| 8,346,781 B1 | 1/2013 | Cornelius |
| 8,364,759 B2 | 1/2013 | Moromisato et al. |
| 8,386,478 B2 | 2/2013 | Wang |
| 8,468,455 B2 * | 6/2013 | Jorgensen .............. G06F 9/4445 715/733 |
| 8,478,817 B2 | 7/2013 | Duggal |
| 8,484,259 B1 | 7/2013 | Makkar et al. |
| 8,504,689 B2 | 8/2013 | Ferris et al. |
| 8,522,137 B1 | 8/2013 | Brown et al. |
| 8,566,391 B2 * | 10/2013 | Saito ..................... G06F 21/105 709/203 |
| 8,572,033 B2 | 10/2013 | Shukla et al. |
| 8,612,439 B2 | 12/2013 | Prahlad et al. |
| 8,706,800 B1 | 4/2014 | Ahmed et al. |
| 8,812,627 B2 | 8/2014 | Donahue et al. |
| 8,813,174 B1 * | 8/2014 | Koeten .................. H04L 67/10 726/1 |
| 8,856,176 B1 | 10/2014 | Venu et al. |
| 8,880,580 B2 | 11/2014 | Simmons et al. |
| 9,164,997 B2 * | 10/2015 | von Haden ......... G06F 17/3007 |
| 9,396,194 B2 | 7/2016 | Kaszynski et al. |
| 2003/0033369 A1 | 2/2003 | Bernhard |
| 2003/0126592 A1 | 7/2003 | Mishra et al. |
| 2004/0059776 A1 | 3/2004 | Pitzel et al. |
| 2004/0205358 A1 | 10/2004 | Erickson |
| 2004/0243827 A1 | 12/2004 | Aquilera et al. |
| 2005/0243760 A1 | 11/2005 | Yoshioka |
| 2005/0289538 A1 | 12/2005 | Black-Ziegelbein et al. |
| 2006/0005168 A1 | 1/2006 | Singh |
| 2006/0070029 A1 | 3/2006 | Laborczfalvi et al. |
| 2006/0074837 A1 | 4/2006 | Braddy et al. |
| 2006/0178778 A1 | 8/2006 | Fuhlbrigge et al. |
| 2007/0106984 A1 | 5/2007 | Olsen et al. |
| 2007/0192739 A1 | 8/2007 | Hunleth et al. |
| 2007/0240098 A1 | 10/2007 | Averett et al. |
| 2007/0254631 A1 | 11/2007 | Spooner |
| 2008/0033921 A1 | 2/2008 | Arrouye et al. |
| 2008/0162493 A1 | 7/2008 | Blohm et al. |
| 2008/0172720 A1 | 7/2008 | Botz et al. |
| 2008/0184157 A1 | 7/2008 | Selig |
| 2008/0189361 A1 | 8/2008 | Greschler et al. |
| 2009/0083707 A1 | 3/2009 | Fujita et al. |
| 2009/0115901 A1 | 5/2009 | Winter et al. |
| 2009/0210721 A1 | 8/2009 | Phillips |
| 2009/0235352 A1 | 9/2009 | Schrijen et al. |
| 2009/0249185 A1 | 10/2009 | Datar et al. |
| 2009/0254572 A1 | 10/2009 | Redlich et al. |
| 2009/0254580 A1 | 10/2009 | Laurion |
| 2009/0288135 A1 | 11/2009 | Chang et al. |
| 2010/0005529 A1 | 1/2010 | Hemade |
| 2010/0088234 A1 | 4/2010 | Moore et al. |
| 2010/0161762 A1 | 6/2010 | Saxena |
| 2010/0199037 A1 * | 8/2010 | Umbehocker ......... G06F 3/0604 711/113 |
| 2010/0257578 A1 | 10/2010 | Shukla et al. |
| 2010/0274910 A1 | 10/2010 | Ghanaie-Sichanie et al. |
| 2010/0281528 A1 | 11/2010 | Hayton et al. |
| 2010/0287219 A1 | 11/2010 | Caso et al. |
| 2010/0325086 A1 | 12/2010 | Skinner et al. |
| 2010/0325199 A1 | 12/2010 | Park et al. |
| 2011/0022642 A1 * | 1/2011 | deMilo ............. G06F 17/30082 707/805 |
| 2011/0063410 A1 | 3/2011 | Robert |
| 2011/0066668 A1 | 3/2011 | Guarraci |
| 2011/0093507 A1 | 4/2011 | Pilip |
| 2011/0137979 A1 | 6/2011 | Seo et al. |
| 2011/0154290 A1 | 6/2011 | Kelly |
| 2011/0184993 A1 | 7/2011 | Chawla |
| 2011/0202672 A1 | 8/2011 | Narayanaswamy et al. |
| 2011/0209045 A1 | 8/2011 | Ghosh et al. |
| 2011/0209049 A1 * | 8/2011 | Ghosh .................... G06Q 10/06 715/236 |
| 2011/0231912 A1 | 9/2011 | Lee et al. |
| 2011/0247074 A1 | 10/2011 | Manring |
| 2011/0252038 A1 | 10/2011 | Schmidt et al. |
| 2011/0252071 A1 | 10/2011 | Cidon |
| 2011/0258535 A1 | 10/2011 | Adler et al. |
| 2012/0005159 A1 | 1/2012 | Wang et al. |
| 2012/0072465 A1 | 3/2012 | McGowan et al. |
| 2012/0084685 A1 | 4/2012 | Heynen et al. |
| 2012/0095878 A1 | 4/2012 | Feldman et al. |
| 2012/0099135 A1 | 4/2012 | Ono |
| 2012/0110646 A1 | 5/2012 | Ajitomi et al. |
| 2012/0117626 A1 | 5/2012 | Yates et al. |
| 2012/0144202 A1 | 6/2012 | Counterman |
| 2012/0144454 A1 | 6/2012 | Lee |
| 2012/0158668 A1 | 6/2012 | Tu et al. |
| 2012/0173612 A1 | 7/2012 | Vegesna-Venkata et al. |
| 2012/0179746 A1 | 7/2012 | Bolgert et al. |
| 2012/0192067 A1 | 7/2012 | DeLuca et al. |
| 2012/0254042 A1 | 10/2012 | Ludemann |
| 2012/0265803 A1 * | 10/2012 | Ha ..................... G06F 17/30902 709/203 |
| 2012/0266229 A1 | 10/2012 | Simone et al. |
| 2013/0018904 A1 | 1/2013 | Mankala et al. |
| 2013/0036455 A1 | 2/2013 | Bodi et al. |
| 2013/0054356 A1 | 2/2013 | Richman et al. |
| 2013/0086670 A1 | 4/2013 | Vangpat et al. |
| 2013/0111336 A1 | 5/2013 | Dorman et al. |
| 2013/0124606 A1 | 5/2013 | Carpenter et al. |
| 2013/0144934 A1 | 6/2013 | Swett et al. |
| 2013/0151657 A1 * | 6/2013 | Lehman ............. G06F 17/30575 709/217 |
| 2013/0282752 A1 | 10/2013 | Day-Richter et al. |
| 2013/0282755 A1 | 10/2013 | Procopio et al. |
| 2013/0304797 A1 | 11/2013 | Warren et al. |

(56) References Cited

U.S. PATENT DOCUMENTS

FOREIGN PATENT DOCUMENTS

| KR | 10-2012-0065072 | 6/2012 |
|---|---|---|
| KR | 10-2013-0007459 | 1/2013 |
| WO | WO 2001/35211 | 5/2001 |
| WO | WO 2010/054374 | 5/2010 |

OTHER PUBLICATIONS

Bibi et al., "A Platform for Delivering Multimedia Presentations on Cultural Heritage," 2010 14th Panhellenic Conference on Informatics, pp. 175-179.
Ellis et al., "Concurrency Control in Groupware Systems," ACM 1989, pp. 399-407.
Guo et al., "Building the PolarGrid Portal Using Web 2.0 and OpenSocial,"SC '09, Nov. 14-20, 2009, Portland, Oregon, USA; 8 pages.
http://web.archive.org/web/20110629120453/https://developer.mozilla.org/en/Setting_up_extension_development_environment, Jun. 29, 2011, printed Jan. 9, 2015, 5 pages.
http://web.archive.org/web/20111006093926/https://addons.mozilla.org/en-US/firefox/extensions/?sort=featured, Oct. 6, 2011, printed Oct. 26, 2014, 9 pages.
http://web.archive.org/web/20111219132014/https://addons.mozilla.org/en-US/seamonkey, Dec. 19, 2011, printed Oct. 26, 2014, 5 pages.
http://web.archive.org/web/20120512130530/https://developer.mozilla.org/en/Setting_up_extension_development_ environment, May 12, 2012, 7 pages.
http://web.archive.org/web/20120819143535/https://addons.mozilla.org/en-US/firefox/extensions/?sort=featured, Aug. 19, 2012, printed Dec. 13, 2013, 3 pages.
http://web.archive.org/web/20121020134710/https://addons.mozilla.org/en-US/seamonkey/extensions, Oct. 20, 2012, printed Dec. 13, 2013, 3 pages.
http://web.archive.org/web/20121021135356/http://support.mozilla.org/en-US/kb/find-and-install-add-ons-add-features-to-firefox, Oct. 21, 2012, printed Dec. 13, 2013, 3 pages.
http://web.archive.org/web20111226173518/http://en.wikipedia.org/wiki/Add-on_(Mozilla), Dec. 26, 2011, printed Oct. 26, 2014, 5 pages.
http://www-archive.mozilla.org/projects/webservices/, snapshot taken Apr. 21, 2008, printed Dec. 13, 2013, 4 pages.
https://addons.mozilla.org/en-US/firefox/addon/extension-manager-extended/, printed Oct. 26, 2014, 2 pages.
https://addons.mozilla.org/En-us/seamonkey/addon/gmail-smime/?src=search, printed Dec. 13, 2013, 2 pages.
International Search Report and Written Opinion dated Jul. 30, 2014 for Application No. PCT/US2014/032167.
International Search Report and Written Opinion for PCT/US2013/037701 dated Jun. 26, 2013, 10 pages.
International Search Report and Written Opinion for PCT/US2013/037773 dated Aug. 21, 2013, 13 pages.
International Search Report and Written Opinion for PCT/US2013/047877 dated Oct. 31, 2013, 9 pages.
International Search Report and Written Opinion for PCT/US2014/029756 dated Jul. 28, 2014, 11 pages.
Mayer et al., "Third-Party Web Tracking: Policy and Technology," Proceedings of the 2012 IEEE Symposium on Security and Privacy, pp. 413-427, May 20-23, 2012.
Nauman et al., "Apex: Extending Android Permission Model and Enforcement with User-Defined Runtime Constraints," ASIACCS '10, Apr. 13-16, 2010, Beijing, China, pp. 328-332.
Nichols et al., "High-Latency, Low-Bandwidth Windowing in the Jupiter Collaboration System," UIST '95. 8th Annual Symposium on User Interface Software and Technology. Proceedings of the ACM Symposium on User Interface Software and Technology, Nov. 14-17, 1995, pp. 111-120.
The OAuth 2.0 Authorization Protocol; draft ietf-oauth-v2-24; Mar. 8, 2012.
Zhou et al., "Taming Information-Stealing Smartphone Applications (on Android)," TRUST 2011, LNCS 6740, pp. 93-107, 2011.
Zissis et al., "Addressing Cloud Computing Security Issues," Future Generation Computer Systems 28 (2012) 583-592.

\* cited by examiner

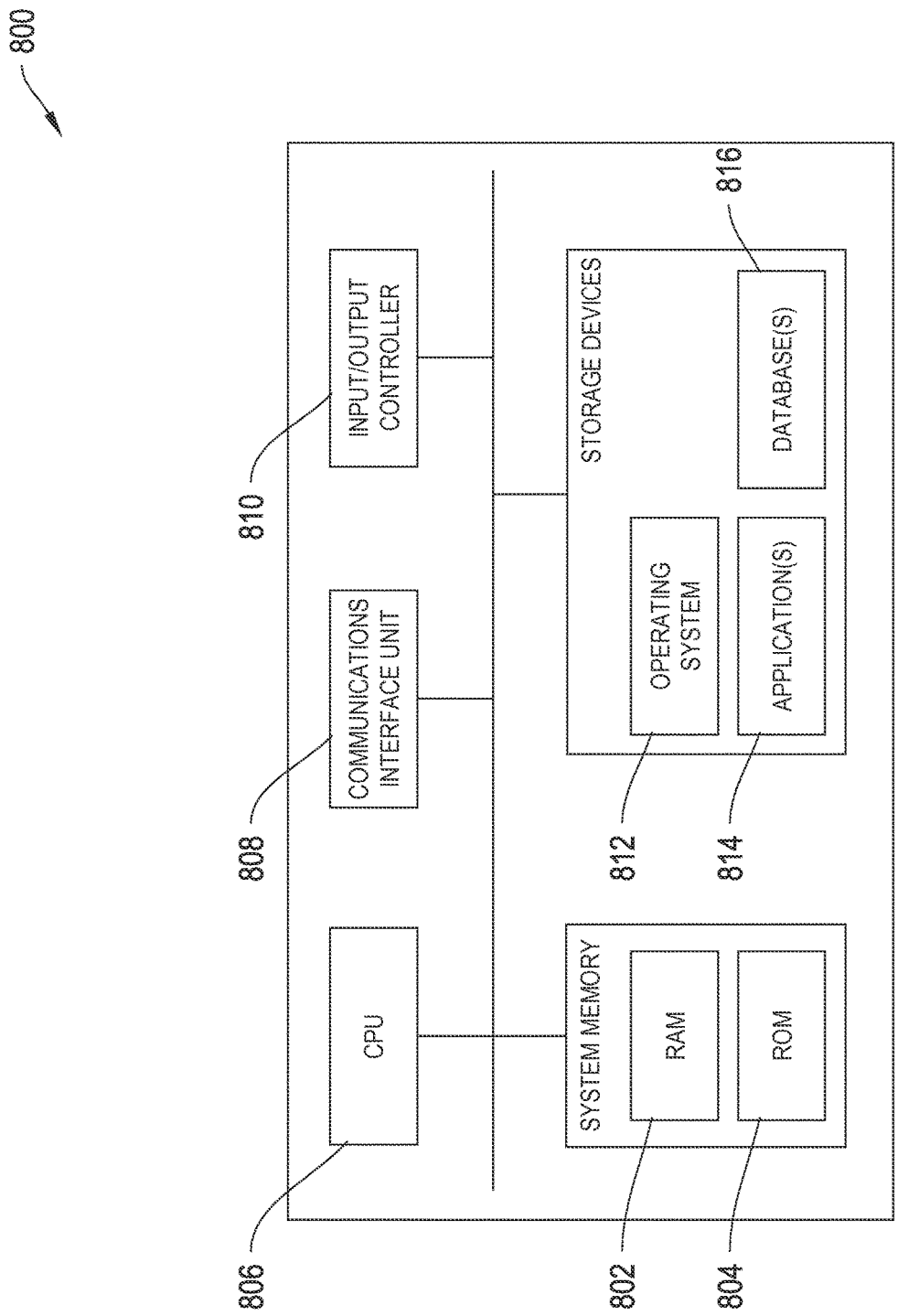

SYSTEM AND METHOD FOR DETECTING AND INTEGRATING WITH NATIVE APPLICATIONS ENABLED FOR WEB-BASED STORAGE

CROSS-REFERENCE TO RELATED APPLICATIONS

This application is a continuation of co-pending U.S. patent application Ser. No. 13/787,187, filed on Mar. 6, 2013, entitled "System and Method for Detecting and Integrating with Native Applications Enabled for Web-Based Storage," which claims benefit under 35 U.S.C. § 119(e) of U.S. Provisional Application No. 61/664,651, filed Jun. 26, 2012, which is incorporated herein by reference in its entirety, and of U.S. Provisional Application No. 61/664,627, filed on Jun. 26, 2012. All of the aforementioned applications are incorporated herein by reference in their entirety.

BACKGROUND

Personal computers traditionally store files locally, on a medium directly accessed by the computer generating or editing the files. As network access has become more widespread, it has become feasible to store files on a remote network. Storing files on a remote network, also referred to as cloud storage, allows a user to access the files using any device that can access the network. Such cloud storage systems reduce the user's need for local storage capacity and assure the user that, regardless of which device is accessing a file, an up-to-date copy of the file is being accessed.

Existing cloud storage systems either copy a file to a user device to be accessed locally or provide a file to an online web-based application that may be run through a web browser on the user device. Copying the file to the user device for local access requires the user device to devote extra resources of the user device to the file. Providing the file to an online web-based application requires the user to access the file using a program that may not be optimized for the user's device. Neither technique is adaptable to performance demands that may vary across time, users or user devices.

SUMMARY

Thus there exists a need in the art to identify applications available to a cloud storage system's user and provide file access to a user-selected application according to the application type. The systems and methods described herein allow a cloud storage system to identify applications which are both available to a user and capable of accessing a file. The systems and methods described herein further allow a cloud storage system to identify the capabilities of a user-selected application and to provide contents of the file being accessed to the user-selected application based on the identified capabilities.

In certain aspects, the systems and methods described herein relate to providing access to a file associated with a cloud storage system. The cloud storage server receives a request to access the file. To fulfill the request, the cloud storage server identifies a request generator. The request generator may be a user associated with the file, a user who generated the request, a device which transmitted the request, or some combination thereof. The cloud storage server may further identify a file type of the file and an application capable of accessing the file type. The cloud storage server may determine whether the identified application is available to the request generator. The applications available to the request generator may include applications installed on a device associated with the request generator or online web-based applications that the request generator is authorized to access. If an application capable of accessing the file type is determined to be available to the request generator, the cloud storage server may determine an application type of the available application. The application type may indicate whether the available application is capable of accessing the file through the cloud storage system. If the available application can access the file through the cloud storage system, the cloud storage server may provide file access information to the available application.

If no identified application is available to the request generator, the cloud storage server may provide the request generator with an option to gain access to an identified application. The cloud storage system may respond to a user selection of such an option by installing the application on a device associated with the request generator. The cloud storage server may also identify whether an application is installed on a user device or whether an application is an online web-based application, and may copy contents of the file to the user device or to a server hosting the online web-based application accordingly.

BRIEF DESCRIPTION OF THE DRAWINGS

The systems and methods described herein are set forth in the appended claims.

However, for the purpose of explanation, several embodiments are set forth in the following drawings.

FIG. 8 is a block diagram of a computing device for performing any of the processes described herein, according to an illustrative implementation.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the systems and methods described herein.

The systems and methods described herein relate to providing access to a file stored on a cloud storage system. In response to a request to access the file, the cloud storage system may identify a request generator, a file type of the file and applications capable of accessing the file type. The cloud storage system may determine which identified applications are available to the request generator. Available applications may include applications installed on a device associated with the request generator and online web-based applications that the request generator is authorized to access. If an identified application is available, the request generator may be provided with a choice of available applications with which to access the file. If no identified application is available to the request generator, the cloud storage system may provide an option of gaining access to an identified application. In some implementations, the cloud storage system may install the identified application on a device associated with the request generator in response to receiving a selection of the option to gain access. In response to an application being found or made available, the cloud storage system may further identify the application type of an available application, which may indicate whether the available application may access the file through the cloud storage system. Applications capable of accessing the file through the cloud storage system may be provided with file access information. Applications incapable of accessing the file through the cloud storage system may be provided with contents of the file.

Figure 1:
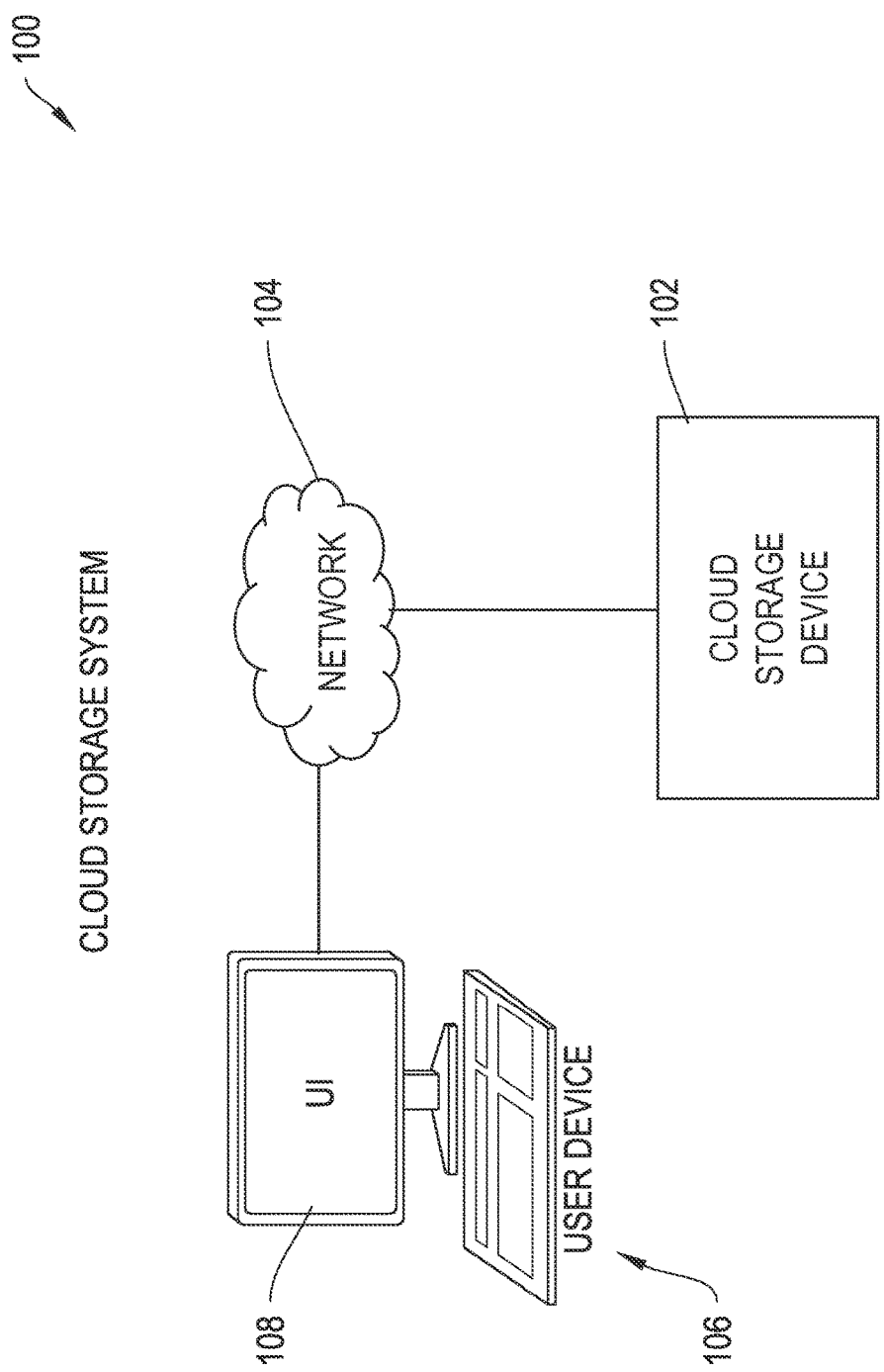
FIG. 1 is a block diagram of a cloud storage system, according to an illustrative implementation.

FIG. 1 is an illustrative block diagram of a cloud storage system 100, which provides remote storage of and access to computer files. Computer files may include text, pictures, audio files, video files, presentation files, spreadsheets, binary data files, computer instructions, HyperText Markup Language (HTML) files, or other suitable files. Files are stored on cloud storage device 102, which may include a server, a personal computer, a mainframe, a cluster of computing devices, or some other suitable computing device, and is described in more detail in relation to FIG. 2. Files may be uploaded to or accessed from cloud storage device 102 via network 104. Network 104 is a computer network, and in certain implementations may be the Internet. A user accesses files on cloud storage device 102 through user device 106. The user may interact with cloud storage device 102 through user interface (UI) 108, which may be generated by user device 106 based on instructions sent by cloud storage device 102.

User device 106 is a computing device used to access cloud storage device 102, and may be a personal laptop computer, a personal desktop computer, a tablet computer, a smartphone, or some other suitable computing device. User device 106 may include installed applications, which in certain implementations may be capable of accessing or altering files stored on cloud storage device 102. In certain implementations, user device 106 may store information regarding the data processing capacity of user device 106, a list of installed applications, a list of file types accessible by each installed application, the capability of each installed application to access a file stored on cloud storage device 102 without downloading a copy of the file, or other suitable information regarding the capability of user device 106 to access files stored on cloud storage device 102. In such implementations, user device 106 may be configured to transmit a portion or the whole of such information upon first connecting to cloud storage device 102, in response to a query by cloud storage device 102, or under other suitable circumstances.

UI 108 is an interface through which a user may access files and applications associated with cloud storage device 102. UI 108 may be an application, such as a web browser or other suitable application, which is run by user device 106 and which displays information received from cloud storage device 102. UI 108 may generate and send commands to cloud storage device 102 in response to a predetermined action by a user, which may include selecting an icon with a cursor or on a touchscreen, selecting a menu option with a cursor or on a touchscreen, writing a text command, or other suitable action. Commands may include requests to access a file with a default application, requests to retrieve a list of applications capable of accessing a file and available to the user, requests to access a file with a selected application, and other suitable commands. In certain implementations, different user interactions with UI 108 may generate different commands.

As an illustrative example of such an implementation on a user device 106 with a touchscreen, UI 108 may detect a user tapping an area of the touchscreen associated with a file. If the user stops pressing the area within a predetermined amount of time, UI 108 may generate a request to access the file using a predetermined default application. If the user presses the area for a period lasting longer than the predetermined amount of time, UI 108 may request a list of available applications capable of opening the file from cloud storage device 102 and provide the list to the user. In response to the user selecting an application from the list, UI 108 may request cloud storage device 102 provide file access to the user-selected application.

Cloud storage system 100 stores computer files and allows a user to access the files with a remote user device 106. User device 106 connects to cloud storage device 102 through network 104. UI 108 displays information provided by cloud storage device 102, such as a list of files associated with the user. A user may interact with UI 108 to request access to a file, such as by selecting icons with a cursor. In response to receiving a file access request, cloud storage device 102 may identify a user selection of an application with which to access the file based on the user's interactions with UI 108, and may provide file access to the user-selected application.

Figure 2:
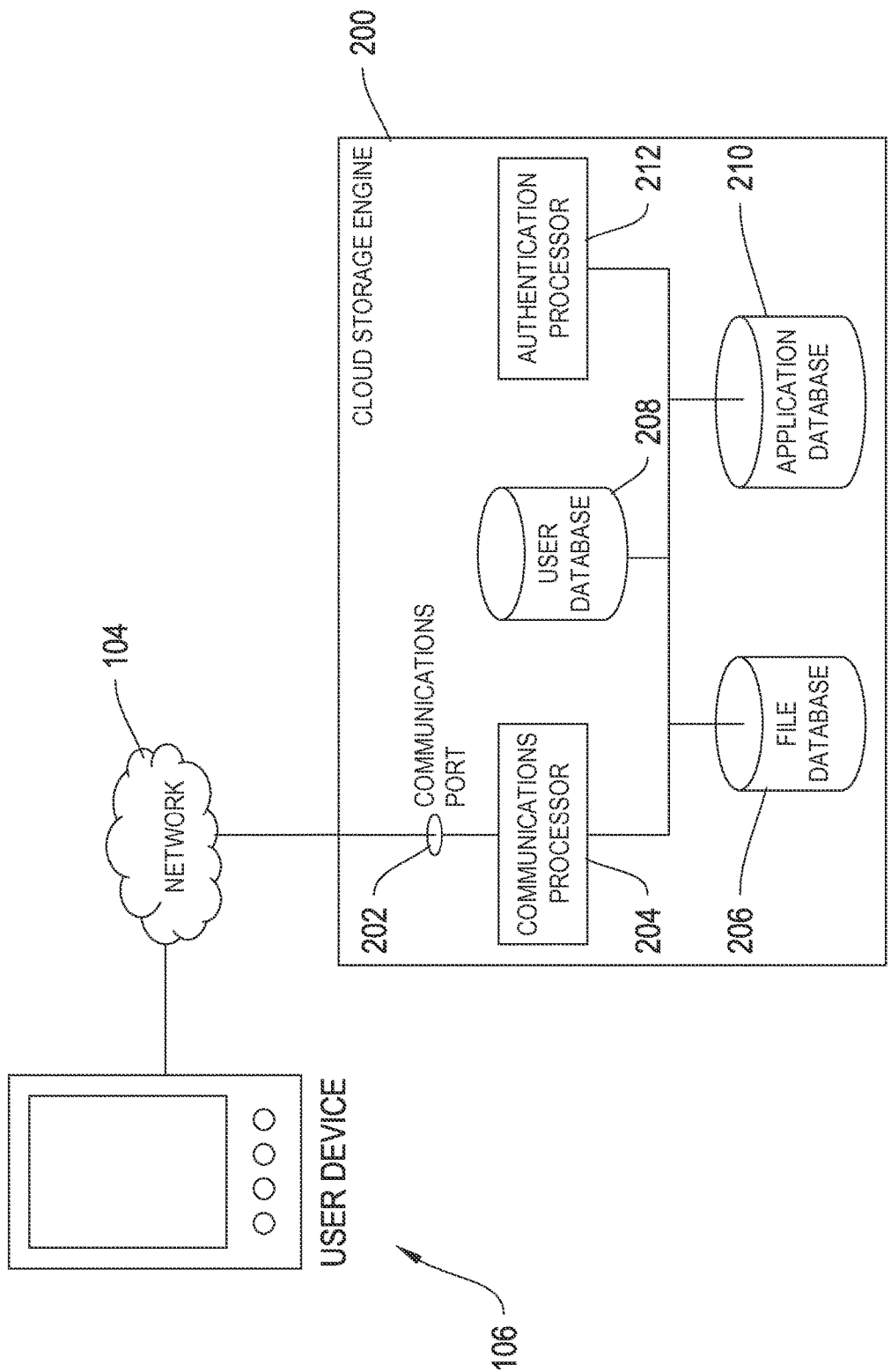
FIG. 2 is a block diagram of a cloud storage engine, according to an illustrative implementation.

FIG. 2 is an illustrative block diagram of a cloud storage engine 200, which may act as the cloud storage device 102 of FIG. 1. Cloud storage engine 200 allows user device 106 to access files over network 104. Cloud storage engine 200 transmits and receives data through communication port 202. Communication processor 204 identifies user instructions received through communication port 202 and transmits information to the user device 106 based on the received instructions. Files are stored in file database 206, user information is stored in user database 208, and information regarding applications may be stored in application database 210. In certain implementations, application database 210 may also store applications. Authentication processor 212 may verify the identity of a user or whether a user-selected application is authorized to access a file associated with cloud storage engine 200.

The depicted communication port 202 is a network port which receives user commands via network 104 and transmits information and file contents sent by cloud storage engine 200. Communication port 202 may include a 100BASE-TX port, a 1000BASE-T port, a 10GBASE-T port, a Wi-Fi antenna, a cellular antenna, or other suitable network ports. In certain implementations, there may be a different number of ports than are depicted. In certain implementations, communication port 202 may provide secure communications, such as by using the Secure Sockets Layer (SSL) protocol, the Transport Layer Security (TLS) protocol, or other suitable protocol.

Communication processor 204 may be a computer processor which identifies instructions received through communication port 202 and transmits information to a user device 106 in response. Upon a user connecting to cloud storage engine 200, communication processor 204 may identify the user, in certain implementations by comparing login information provided by the user to information stored in user database 208. Communication processor 204 may further identify the user device 106 from packet headers identifying the source of data received from the user, by querying the user device 106, from information provided by the user device 106 at login, or through some other suitable method of identifying the user device. In response to a user command to access a file, communication processor 204 may identify the file type of the file from a file extension, from a Multipurpose Internet Mail Extension (MIME) type associated with the file, file metadata, or from some other suitable identifying information associated with the file. Communication processor 204 may identify a list of available applications capable of accessing the identified file type by some combination of querying user device 106 for a list of installed applications capable of accessing the identified file type, by identifying cloud storage applications associated with the user and capable of accessing the identified file type, or by some other suitable method. In some implementations, if no application capable of accessing the identified file type is available, communication processor 204 may provide a user with an option to gain access to one or more applications capable of accessing the identified file type. Such an option may be provided by instructing UI 108 to display a message with a link to gain access to an application. In some such implementations, communication processor 204 may install an application on a user device 106 in response to a user accepting an option to gain access to an application. Communication processor 204 may provide the list to user device 106 and allow the user to select an application from the list to access the file. In certain implementations, a user command to access a file may designate an application to access the file, such as by indicating that the file is to be accessed with a predetermined default application. In such implementations, communication processor 204 may not identify or transmit a list of other available applications. Once a user-selected application has been identified, communication processor 204 provides file access to the application.

To provide file access to an application, communication processor 204 identifies an application type of the application. Application types may include applications installed on user device 106, referred to herein as "native applications," and may identify whether an application is configured to access cloud storage engine 200, referred to herein as being "cloud-capable." Applications not installed on user device 106 may include online web-based applications provided through cloud storage engine 200, referred to herein as "first-party cloud applications," or online web-based applications not provided through cloud storage engine 200, referred to herein as "third-party cloud applications." Communication processor 204 may allow access to contents of a file or to metadata associated with the file based on the type of the user-selected application. As an illustrative example, communication processor 204 may allow a cloud-capable native application or a first-party cloud application to access both a file and metadata associated with the file, but may transmit only a copy of a file to a user device 106 running a cloud-incapable native application or to a server hosting a third-party cloud application. In some implementations, some third-party cloud applications may be cloud-capable while others are not.

File database 206 may be a computer-readable and -writable medium storing at least one file associated with a cloud storage system 100, which may include text, images, audio files, video files, spreadsheets, presentation files, HTML files, or other suitable computer files. File database 206 may also store metadata associated with each file, which may include a MIME type type of the file. In certain implementations, file metadata may also include one or more users authorized to view or edit the file, the application used to generate the file, a default application for accessing the file, a record of when and by whom the file was previously accessed or edited, or other suitable information. In some implementations, a portion of file database 206 may be accessed through a remote network, and may be a third-party database.

User database 208 may be a computer-readable and -writable medium storing information associated with at least one user of cloud storage engine 200. The information may include one or more of a username and password associated with a user, a list of the files associated with each user, a list of at least one user device 106 associated with the user, a list of cloud applications associated with the user, a list of applications available to a user, a list of each application the user has authorized to access each file or file type represented in the user's files, a default application the user has identified for accessing a file type, user-specified preferences, or other suitable user information.

Application database 210 may be a computer-readable and -writable medium storing information regarding applications associated with cloud storage engine 200. Application database 210 may include compiled or uncompiled computer instructions comprising an application, a link to access a cloud application, a link to download a native application, an icon associated with the application, a description of the application, or other suitable information regarding an application. First-party cloud applications may be stored as computer instructions that may be performed by a web browser run on a user device 106, which may be written in HTML, JavaScript, Asynchronous JavaScript and XML (Ajax), or another suitable computer language. In certain implementations, a first-party cloud application may be executed by cloud storage engine 200 and one or more outputs from the first-party cloud application may be transmitted to a user device 106. Application database 210 may store metadata associated with an application, which may include file types the application is capable of opening, the varieties of user device 106 on which the application may run, the users authorized to use the application, whether the application is cloud-capable, alternate versions of the application, or other suitable information. In certain implementations, application database 210 may include metadata for an application not stored in application database 210.

Authentication processor 212 may be a computer processor which blocks unauthorized access of information associated with cloud storage engine 200. Unauthorized access may be detected by comparing one or more of a username and password combination, information identifying a user device 106, geographic information associated with the user device 106, or other suitable information with information stored in user database 204. If a request generator is not successfully verified, authentication processor 212 may transmit a message to the user or a system administrator, block user device 106, temporarily lock the user account, or take some other predetermined action. In certain implementations, if a user device 106 has not previously been connected to cloud storage engine 200, authentication processor 212 may require the user to provide identification information, which may include a username and password combination, an identification number provided to the user by a voice or text message sent to a telephone number previously provided by the user, or other predetermined identification information. In certain implementations, authentication processor 212 may verify that an application may be allowed to access a file by searching file database 206, user database 208, and application database 210 to determine whether the application is associated with the user, whether the application is associated with the file type of the file, whether the user has authorized the application to access the file or the file type, or other suitable verification information. In some such implementations, authentication processor 212 may verify a security token provided by the application against information stored in one or more of file database 206, user database 208, or application database 210. If an application is not authorized to access a file, authentication processor 212 may prevent the application from accessing the file, transmit a message to the user or a system administrator, or take some other suitable action. In certain implementations, such a message to the user may ask if the user wishes to authorize the application to access the file. In certain implementations, authentication processor 212 may establish a secure connection with user device 106 using a protocol such as the SSL or TLS protocols.

Cloud storage engine 200 receives transmissions from user device 106 at communication port 202 via network 104. Communication processor 204 may identify an account associated with a user upon the establishment of a connection with a user device 106, and authentication processor 212 may compare information provided by user device 106 with information stored in user database 208 to verify that the user has access to the account. Communication processor 204 may provide information regarding files associated with the account to user device 106, and may receive a user command to access a file associated with the account. Communication processor 204 may respond to a file access command by identifying a file type of the file and a list of applications available to access the file type. The list may be generated by some combination of identifying applications stored in application database 210 and by determining applications installed on user device 106. The list may be provided to the user by communication processor 204. When communication processor 204 receives a request to provide file access to an application, authentication processor 212 may determine whether the application is authorized to access the file from information stored in file database 206 or user database 208. If the application is authorized to access the file, communication processor 204 may identify the application type from information stored in application database 210 or from information provided by user device 106. The application may be given access to contents of the file based on its application type. In certain implementations, communication processor 204 may provide access to the contents of a file to a native cloud-incapable application by copying the file to user device 106.

Figure 3:
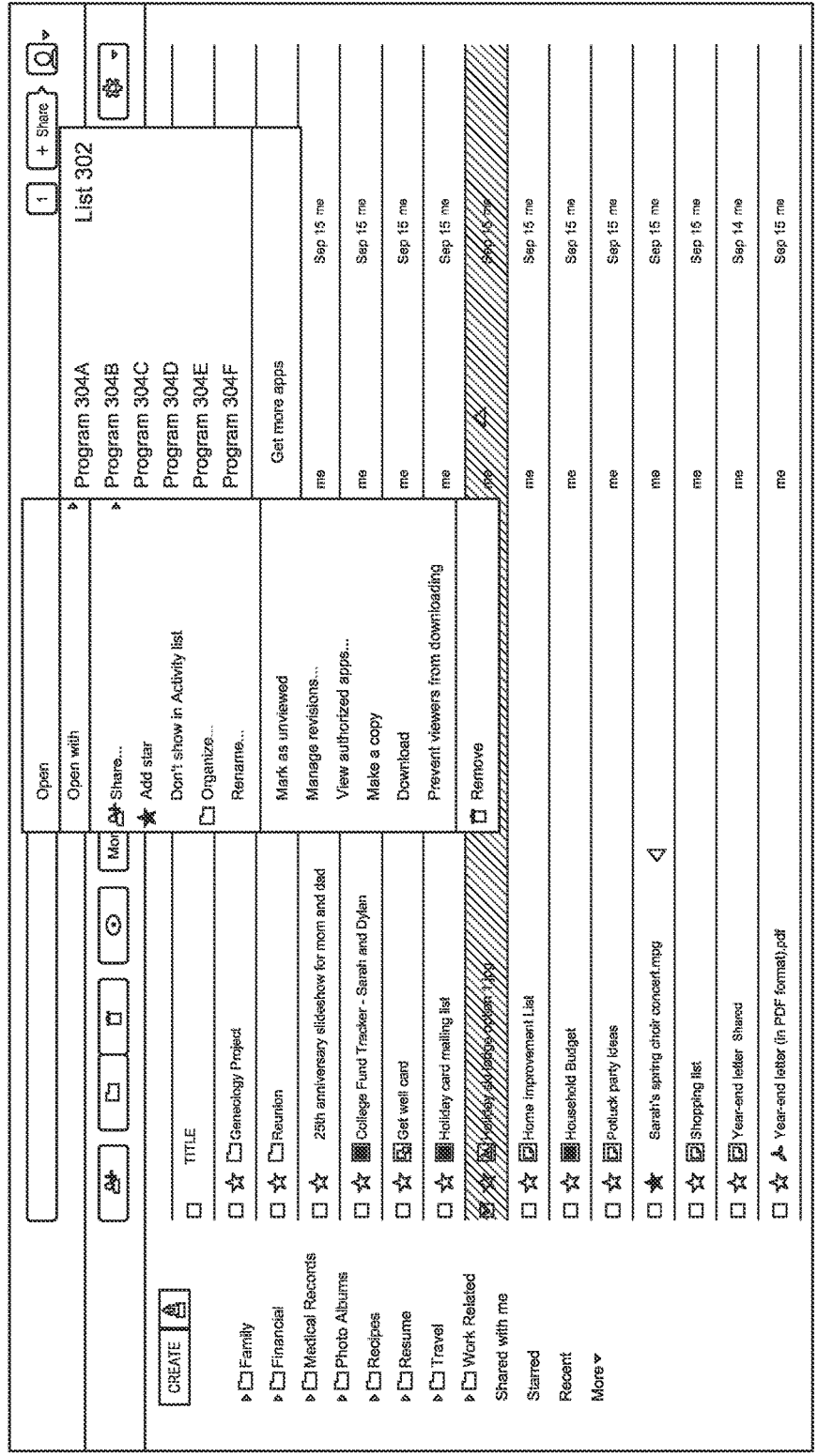
FIG. 3 depicts an exemplary screenshot of a user interface for presenting a user with a list of applications available to a personal computer to access a file on the cloud storage system of FIG. 1, according to an illustrative implementation.

FIG. 3 depicts an exemplary screenshot of a UI 300 that may be UI 108 of FIG. 1. UI 300 is displayed on a desktop or laptop personal computer, and presents a user with a list of applications capable of accessing a file. As depicted, the user has not requested to access the file using a default application, and is therefore presented with a list 302 of available applications. List 302 is generated by communication processor 204, which may present the list to the user through UI 108. The user may select one of the programs 304A-F to access the file. In certain implementations, the user may further indicate a new default application with which to open the file or file type in the future. In some implementations, the list may indicate an application type of one or more of the applications.

Figure 4:
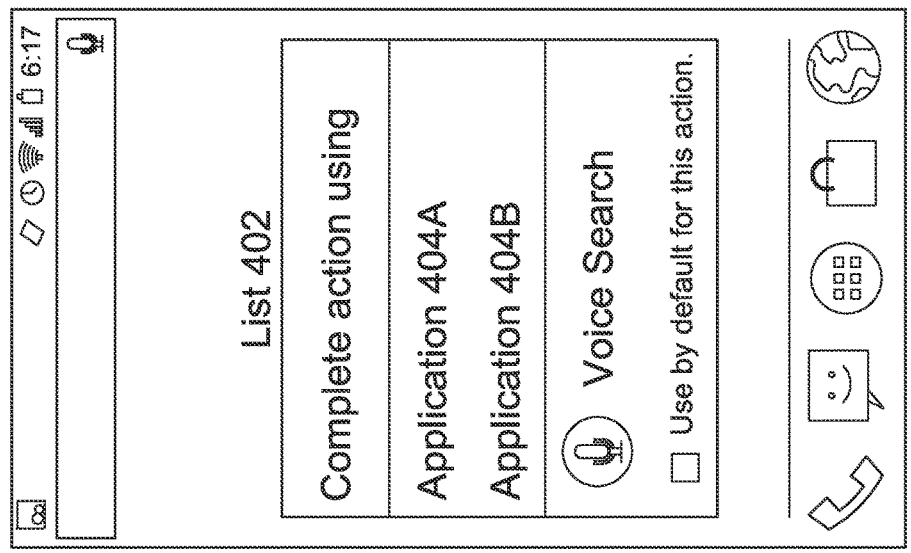
FIG. 4 depicts an exemplary screenshot of a user interface for presenting a user with a list of applications available to a mobile computing device to access a file on the cloud storage system of FIG. 1, according to an illustrative implementation.

FIG. 4 depicts an exemplary screenshot of a UI 400 that may be UI 108 of FIG. 1. UI 400 is displayed on a mobile computing device, which may include a smartphone or a tablet computer, and presents a user with a list of applications capable of accessing a file. As depicted, the user has not requested to access the file using a default application, and is therefore presented with a list 402 of available applications. List 402 is generated by communication processor 204. The user may select one of the programs 404A-B to access the file. In the depicted implementation, the user may further indicate a new default application with which to open the file or file type in the future.

Figure 5:
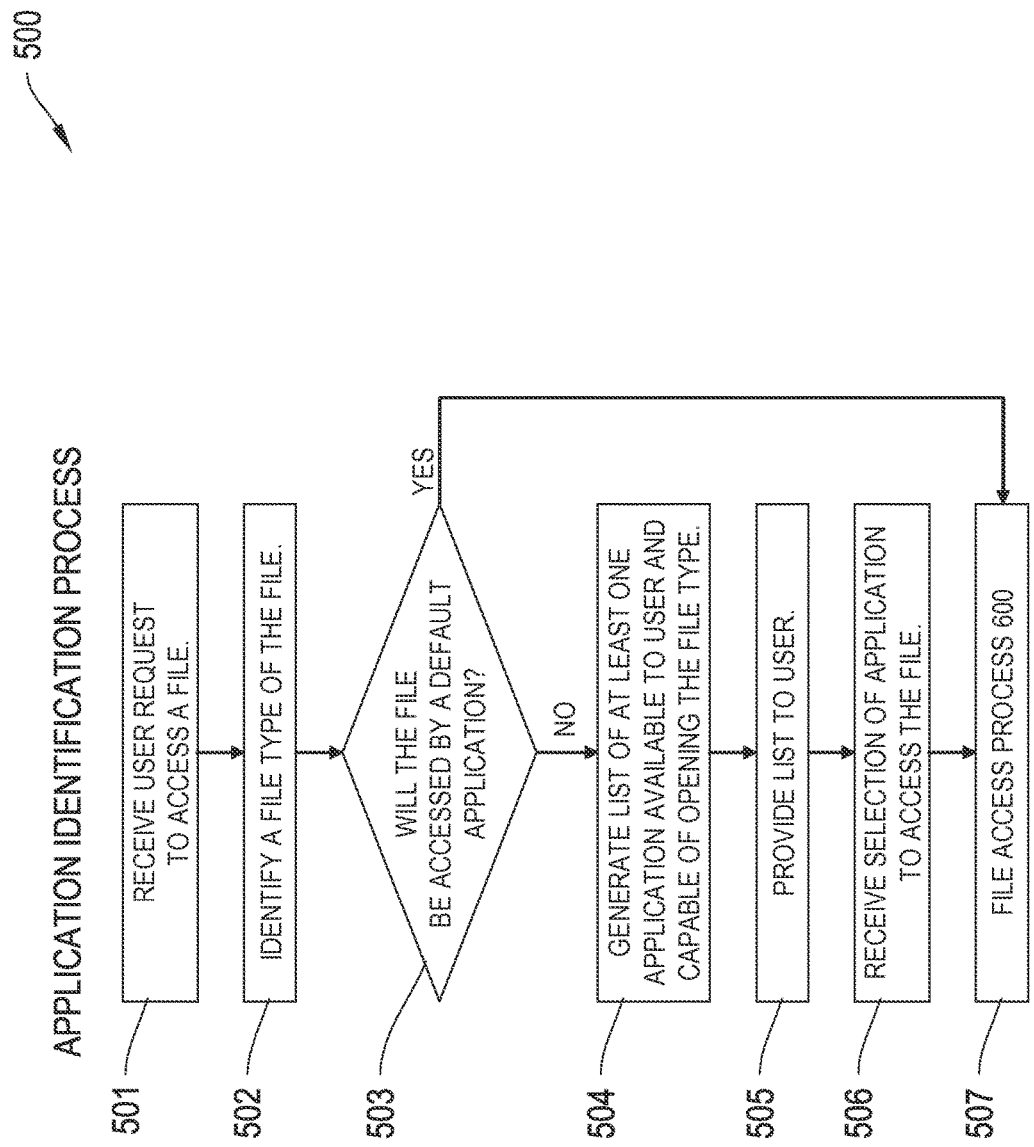
FIG. 5 is a flow chart of a process for identifying an application to access a file stored on the cloud storage system, according to an illustrative implementation.

FIG. 5 is an illustrative flow chart of an application identification process 500. Application identification process 500 identifies a user selection of an application to access a file. Referring to FIG. 2, application identification process 500 begins with step 501, in which communication processor 204 receives a request to access a file. The user may generate the request through UI 108. In certain implementations, step 501 may be preceded by user verification process 600, described in detail in relation to FIG. 6. In step 502, communication processor 204 determines the file type of the requested file, in some implementations by examining the MIME type of the file listed in file database 206.

Having identified the file type of the requested file, application identification process 500 continues to step 503, which identifies whether the user has selected to access the file with an available default application. A default application may be an application a user has selected for opening all files of a file type, for opening a particular file, or for opening files of some other suitable characteristic, and may be identified by information stored in file database 206, user database 208, or application database 210. In cases where application database 210 identifies a default application, step 503 may be preceded by step 504, described below. A user may choose default applications by manually identifying an application used to open a particular file or file type, by establishing that the application the user most recently used to access the file is the default application, by establishing that the application used to generate the file is the default application, or by other suitable methods for choosing a default application. In certain implementations, a default application may depend on the user device 106 being used to access the file. As an illustrative example of such implementations, a user may choose a native image display application as the default application for accessing a picture with a mobile device, but choose a first-party cloud image editing application as the default application to access the same picture with a laptop computer. As an alternative example, a user may designate an application as the default application for accessing a file, with the native version of the application the default on a user device 106 which has the application installed and the cloud application the default on a user device 106 which does not have the application installed. If the user indicates that the file is to be accessed with a default application, the default application may access the file according to file access process 600, described in relation to FIG. 6; otherwise, application identification process 500 continues to step 504.

In step 504, communication processor 204 may generate a list of at least one application available to the user and capable of opening the identified file type. As described in relation to FIG. 2, communication processor 204 may query user device 106 to identify available native applications, may retrieve a list of available applications from user database 208, or identify available applications through some other suitable source. In certain implementations, if no application capable of opening the identified file type is available to the user, communication processor 204 may generate a message to the user declaring that no application is available to open the file. In such implementations, the message may further suggest how the user may gain access to an application in application database 210 capable of opening the file.

In step 505, communication processor 204 provides the list of available applications to the user, in certain implementations by sending a command to user device 106 to display an application selection interface such as UI 300 or 400, as depicted in FIGS. 3 and 4. In step 506, communication processor 204 receives a selection of an available application with which to access the file. The user-selected application may then access the file according to file access process 600.

Figure 6:
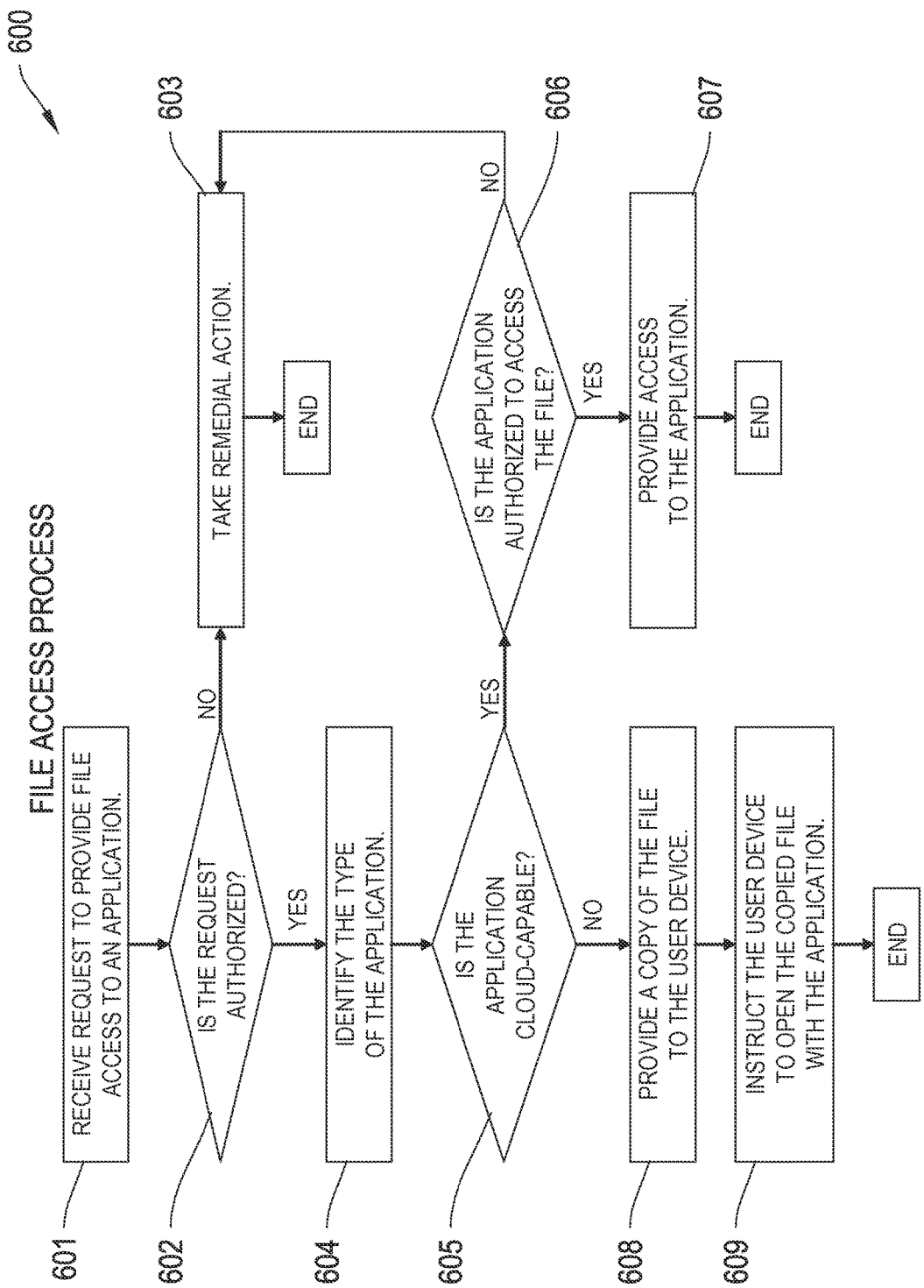
FIG. 6 is a flow chart of a process for accessing a file stored on the cloud storage system, according to an illustrative implementation.

FIG. 6 is an illustrative flow chart of a file access process 600. File access process 600 provides access to a file by a user-selected application. Referring to FIG. 2, communication processor 204 receives a request to provide file access to an application in step 601. In certain implementations, the request may constitute the intent of a user to authorize the application to access the file. In step 602, authentication processor 212 determines whether the request is authorized, which may include confirming that the request was provided through a secure connection associated with the user, verifying a user identity using the user verification process 700 described in relation to FIG. 7, or by some other suitable method. If the request is unauthorized, communication processor 204 takes remedial action in step 603, which may include blocking the application from accessing the file, alerting the user or a system administrator, transmitting a message to the user informing them how they may authorize the application to access the file, or some other appropriate action. If the request is authorized, communication processor 204 identifies the type of the user-selected application in step 604.

Having identified the application type, file access process 600 continues to step 605, in which communication processor 204 determines whether the application is cloud-capable. If so, in step 606 authentication processor 212 determines whether the application is authorized to access the file, as described in relation to FIG. 2. In certain implementations, communication processor 204 may instruct a user device 106 or an element of network 104 to launch the application in order for the application authorization to be verified. If the application is not authorized to access the file, file access process 600 proceeds to step 603. If the cloud-capable application is authorized to access the file, in step 607 communication processor 204 will provide the application with access to the file, which may include providing the application with file identification information and permitting the application to request or edit data associated with the file identification information. In certain implementations, communication processor 204 may instruct a user device 106 or an element of network 104 to launch the cloud-capable application before providing the file identification information.

If the application is not found to be cloud-capable in step 605, communication processor 204 copies the file to the user device 106 in step 608, and may instruct user device 106 to open the copied file with the application in step 609. In certain implementations, authentication processor 212 may confirm that user device 106 is authorized to store the file or that the cloud-incapable application is authorized to access the file before copying the file to user device 106. In some implementations, the file may be copied to an element of network 104, such as a server running a third-party cloud application, and the application may access the file copy on the element of network 104.

Figure 7:
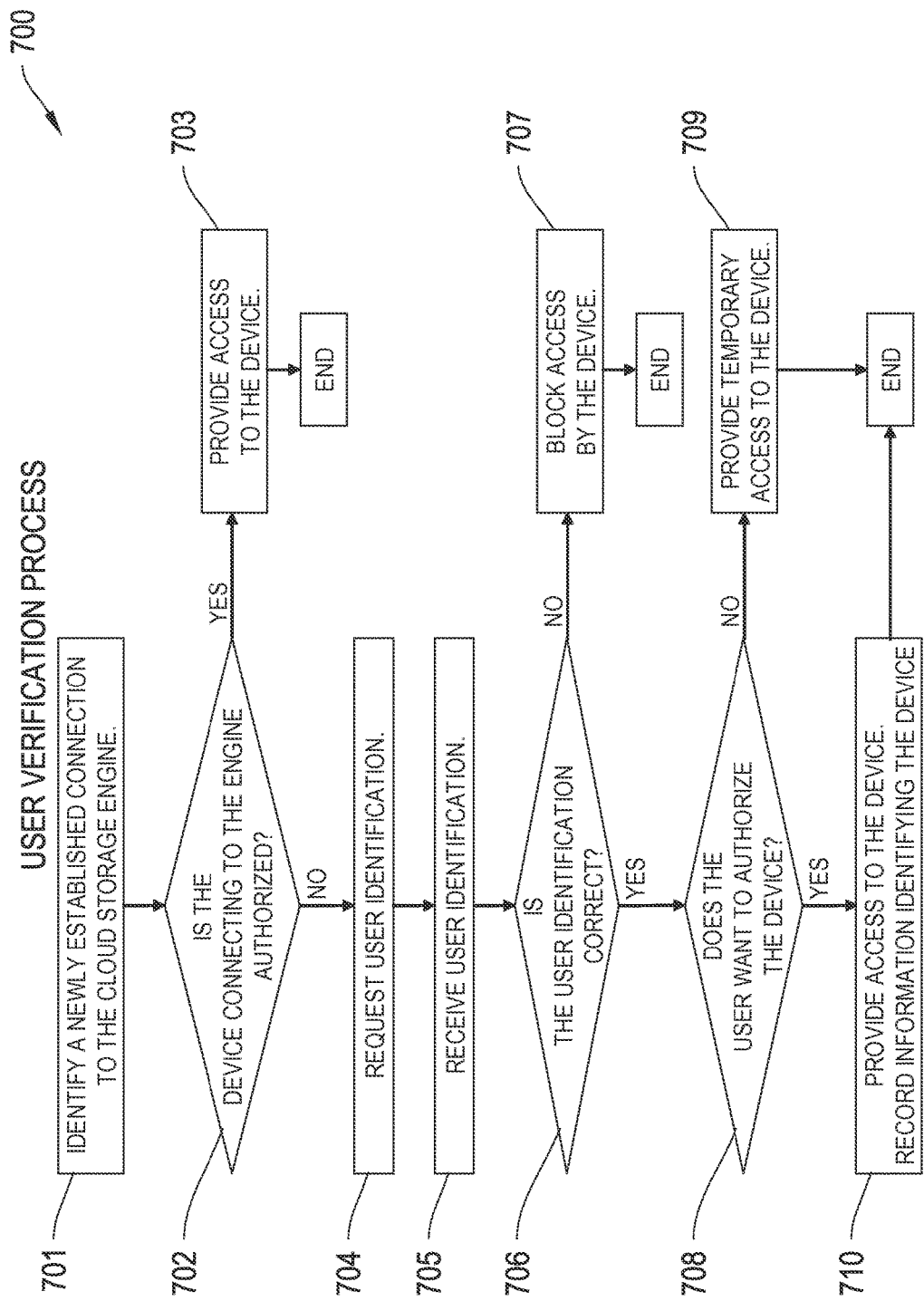
FIG. 7 is a flow chart of a process for verifying the identity of a user of the cloud storage system, according to an illustrative implementation.

FIG. 7 is an illustrative flow chart of a user verification process 700. Referring to FIG. 2, user verification process 700 verifies that a request generator is authorized to access a set of files associated with cloud storage engine 200. User verification process 700 begins with step 701, in which communication processor 204 identifies a newly established connection between cloud storage engine 200 and a user device 106. In step 702, authentication processor 212 determines whether the user device 106 has been authorized to access data associated with a user listed in user database 208, which may include comparing identifying information provided by the user device 106 with information stored in user database 208, such as a Media Access Control (MAC) address associated with the user device, a security token associated with the user device, or other identifying information.

If step 702 confirms that the user device 106 is authorized, authentication processor 212 may allow the user device 106 to access the authorizing user's data in step 703. In certain implementations, authentication processor 212 may examine other data before allowing the user device 106 to access the authorizing user's data. In such implementations, authentication processor 212 may compare information stored in user database 208 with Global Positioning System (GPS) data from the user device 106, IP routing data, or other data associated with the user device 106, and may proceed to step 707 in the case of a mismatch. As an illustrative example of such implementations, if a first user device 106 is accessing data associated with a user account, and a second user device 106 in a different geographic location attempts to access data associated with the same user account, authentication processor 214 may block the second user device 106 from accessing the cloud storage engine 200. In certain implementations, a first user device 106 may be authorized to access a different set of the same user's files as a second user device 106. As an illustrative example of such an implementation, a user may authorize a mobile computing device to access files associated with the user but not sensitive financial files associated with the user's account.

If the user device 106 is not authorized, user verification process 700 may proceed to step 704. In step 704, authentication processor 212 may transmit a request for user identification information to the user device 106 via communication processor 204. Communication processor 204, upon receiving the user identification information in step 705, passes the information to authentication processor 212 so that the user identification information may be verified in step 706. User identification information may be compared against information stored in user database 208, and may include a user ID and password combination, a personal identification number (PIN), an automatically generated identification number provided to a phone number provided by the user, or other suitable identifying information. If the user identification is incorrect, authentication processor 212 may instruct communication processor 204 to block access by the device in step 707, and may temporarily block access to the account, alert the user or a systems administrator, or take other suitable action.

If the user identification is correct, step 708 may determine whether the user wants to authorize the user device 106, which may be determined by identifying whether the user selected a "Remember this device" option in providing identification information, by transmitting a prompt to the user to select whether to permanently authorize the user device 106, or by some other suitable method. If not, the authentication processor 212 provides the user device 106 with temporary access in step 709. Otherwise, in step 710 the authentication processor 212 provides the user device 106 with access to cloud storage engine 200 and records information identifying the device in user database 208.

FIG. 8 is a block diagram of a computing device that can be used to implement or support any of the components of the system of FIG. 1 or 2, and for performing any of the processes described herein. Cloud storage engine 200 may be implemented on one or more computing devices 800 having suitable circuitry, and user device 106 may communicate with cloud storage device 102 through one or more computing devices 800 having suitable circuitry. In certain aspects, a plurality of the components of cloud storage system 100 may be included within one computing device 800. In certain implementations, a component and a storage device may be implemented across several computing devices 800.

The computing device 800 comprises at least one communications interface unit, an input/output controller 810, system memory, and one or more data storage devices. This can support a network connection such as a connection to network 104 in FIG. 1. The system memory includes at least one random access memory (RAM 802) and at least one read-only memory (ROM 804). RAM 802 can support the file database 206 of FIG. 2, for example. All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 may be linked, via network or local network, to other servers or systems.

The computing device 800 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 808 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers, or client terminals.

The CPU 806 is also in communication with the data storage device. The data storage device may comprise an appropriate combination of magnetic, optical, or semiconductor memory, and may include, for example, RAM 802, ROM 804, flash drive, an optical disc such as a compact disc, or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver, or other similar wireless or wired medium or combination of the foregoing. For example, the CPU 806 may be connected to the data storage device via the communications interface unit 808. The CPU 806 may be configured to perform one or more particular processing functions.

The data storage device may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program. The depicted database 816 can be any suitable database system, and can be a local or distributed database system.

The operating system 812 and applications 814 may be stored, for example, in a compressed, an uncompiled and an encrypted format, and may include computer program code. The instructions of the program may be read into a main memory of the processor from a computer-readable medium other than the data storage device, such as from the ROM 804 or from the RAM 802, or from a computer data signal embodied in a carrier wave, such as that found within the well-known Web pages transferred among devices connected to the Internet. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to a cloud storage system as described herein. The program also may include program elements such as an operating system 812, a database management system, and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic, or optical signals, which are exemplary forms of wireless communications or data streams that carry various types of information.

Some implementations of the above described may be implemented by the preparation of application-specific integrated circuits or by interconnecting an appropriate network of conventional component circuits, as will be apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. For example, cloud storage engine 200 may install a native version of a user-selected application on a user device 106 if the application is not installed. Also, cloud storage engine 200 may respond to a command to run an application by running a native version of the application if installed, but run the cloud version of the same application otherwise. It should be understood that various alternatives to the embodiments of the disclosure described herein may be employed in practicing the disclosure. Elements of an implementation of the systems and methods described herein may be independently implemented or combined with other implementations. It is intended that the following claims define the scope of the disclosure and that methods and structures within the scope of these claims and their equivalents be covered thereby.

We claim:

1. A computer-implemented method of providing access to a file on a cloud storage system, comprising:
receiving a request from a request transmitting device to access a file on the cloud storage system, the request transmitting device being external to a cloud storage engine in the cloud storage system;
identifying a file type of the file;
identifying at least one application capable of accessing the file based on the file type, wherein the at least one application comprises an application installed at the request transmitting device or an online web-based application capable of accessing the file with the identified file type;
determining whether the at least one application is cloud-capable of accessing the file stored on the cloud storage engine in the cloud storage system based on an application type of the at least one application;
providing access to the file to the at least one application responsive to determining that the at least one application is cloud-capable of accessing the file stored on the cloud storage engine in the cloud storage system; and
providing a copy of the file to the request transmitting device for the at least one application to access the file, responsive to determining that the at least one application is not cloud-capable of accessing the file stored on the cloud storage engine in the cloud storage system.

2. The method of claim 1, further comprising:
identifying the request transmitting device, wherein the request transmitting device is a user associated with the file, a user who generated the request, or a device which transmitted the request.

3. The method of claim 1, further comprising:
determining whether the at least one identified application is available to the request transmitting device.

4. The method of claim 1, wherein the at least one identified application is cloud-capable when the at least one identified application is configured to access a cloud storage engine of the cloud storage system.

5. The method of claim 1, further comprising:
in response to determining that the at least one identified application is not available to the request transmitting device:
providing an option to gain access to the at least one identified application,
in response to receiving a selection of the option, determining an application type of the at least one identified application, wherein the application type indicates whether the at least one identified application is capable of accessing the file through the cloud storage system, and:
providing file access information to the at least one identified application if the at least one identified application is capable of accessing the file through the cloud storage system, or
providing a copy of the file to the at least one identified application if the at least one identified application is not capable of accessing the file through the cloud storage system.

6. The method of claim 1, further comprising:
querying a device associated with the request transmitting device for a list of applications installed on the device.

7. The method of claim 1, further comprising:
searching a list of applications associated with the request transmitting device, wherein the list is stored on the cloud storage system.

8. The method of claim 1, wherein the at least one identified application includes a web-based application associated with the request, or a predetermined default application associated with the file type.

9. The method of claim 1, wherein the file type is identified by a Multipurpose Internet Mail Extension (MIME) type associated with the file.

10. The method of claim 1, wherein the application type indicates whether the application is installed on a user device, or whether the application is an online web-based application.

11. A cloud storage system for providing access to a file, the cloud storage system comprising:
a processor;
a file database communicatively coupled to the processor, the file database for storing a plurality of files and metadata associated with each of the plurality of files; and
a user database communicatively coupled to the processor, the user database for storing information associating at least one user with at least one file,
wherein the processor is configured to:
receive a request from a request transmitting device to access a file in the file database, the request transmitting device being external to a cloud storage engine in the cloud storage system;
identify a file type of the file;
identify at least one application capable of accessing the file based on the file type, wherein the at least one application comprises an application installed at the request transmitting device or an online web-based application capable of accessing the file with the identified file type;
determine whether the at least one application is cloud-capable of accessing the file stored in the file database on the cloud storage system based on an application type of the at least one application;
provide access to the file to the at least one application responsive to determining that the at least one application is cloud-capable of accessing the file stored in the file database; and
provide a copy of the file the request transmitting device for the at least one application to access the file, responsive to determining that the at least one application is not cloud-capable of accessing the file stored in the file database.

12. The system of claim 11, wherein the processor is further configured to:
identify the request transmitting device, wherein the request transmitting device is a user associated with the file, a user who generated the request, or a device which transmitted the request.

13. The system of claim 11, wherein the processor is further configured to:
determine whether the at least one identified application is available to the request transmitting device.

14. The system of claim 11, wherein the at least one identified application is cloud-capable when the at least one identified application is configured to access a cloud storage engine of the cloud storage system.

15. The system of claim 11, wherein the processor is further configured to:
in response to determining that the at least one identified application is not available to the request transmitting device:
provide an option to gain access to the at least one identified application,
in response to receiving a selection of the option, determine an application type of the at least one identified application, wherein the application type indicates whether the at least one identified application is capable of accessing the file through the cloud storage system, and:
provide file access information to the at least one identified application if the at least one identified application is capable of accessing the file through the cloud storage system, or
provide a copy of the file to the at least one identified application if the at least one identified application is not capable of accessing the file through the cloud storage system.

16. The system of claim 11, wherein the processor is further configured to:
query a device associated with the request transmitting device for a list of applications installed on the device.

17. The system of claim 11, wherein the processor is further configured to:
search a list of applications associated with the request transmitting device, wherein the list is stored on the cloud storage system.

18. The system of claim 11, wherein the at least one identified application includes a web-based application associated with the request transmitting device, or a predetermined default application associated with the file type.

19. The system of claim 11, wherein the file type is identified by a Multipurpose Internet Mail Extension (MIME) type associated with the file.

20. The system of claim 11, wherein the application type indicates whether the application is installed on a user device, or whether the application is an online web-based application.

21. Non-transitory computer-readable media having recorded thereon instructions, that when executed by one or more computer processors, perform operations comprising:
receiving a request from a request transmitting device to access a file on the cloud storage system, the request transmitting device being external to a cloud storage engine in the cloud storage system;
identifying a file type of the file;
identifying at least one application capable of accessing the file based on the file type, wherein the at least one application comprises an application installed at the request transmitting device or an online web-based application capable of accessing the file with the identified file type;
determining whether the at least one application is cloud-capable of accessing the file stored on the cloud storage engine in the cloud storage system based on an application type of the at least one application;
providing access to the file to the at least one application responsive to determining that the at least one application is cloud-capable of accessing the file stored on the cloud storage engine in the cloud storage system; and providing a copy of the file to the request transmitting device for the at least one application to access the file, responsive to determining that the at least one application is not cloud-capable of accessing the file stored on the cloud storage engine in the cloud storage system.

\* \* \* \* \*